Figure 1:
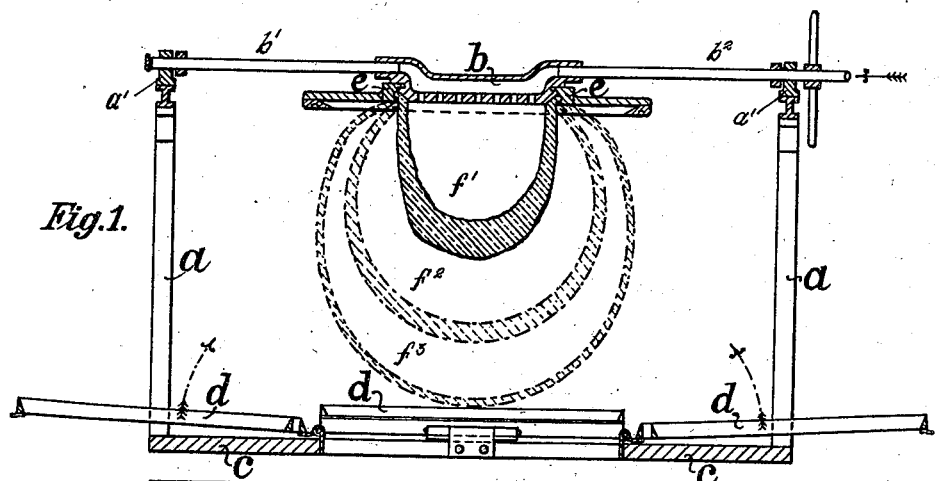

No. 725,497. PATENTED APR. 14, 1903.
P. T. SIEVERT.
PROCESS OF MANUFACTURING SHEET GLASS.
APPLICATION FILED DEC. 26, 1901.
NO MODEL.

Fig. 2.ª

Fig. 4.ª

Witnesses.
Henry Thieme
George Barry Jr.

Inventor:
Paul Theodor Sievert
by attorneys
Brown & Seward

UNITED STATES PATENT OFFICE.

PAUL THEODOR SIEVERT, OF DRESDEN, GERMANY.

PROCESS OF MANUFACTURING SHEET-GLASS.

SPECIFICATION forming part of Letters Patent No. 725,497, dated April 14, 1903.

Application filed December 26, 1901. Serial No. 87,201. (No specimens.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in the Process of Manufacturing Sheet-Glass, of which the following is a specification.

The improvement which constitutes the present invention is based upon the process described in my United States Patents Nos. 651,059 and 641,048, according to which a hot liquid layer of glass is spread out on the perforated surface of a hollow plate, upon which it is held by a frame while it is subjected to the action of an elastic pressure medium for the purpose of expanding the part of the said hot liquid glass layer included within the said frame.

The object of the present invention is to adapt the said process to the economical manufacture of sheets of glass with perfect fire-polish on both sides.

In carrying out my invention I proceed in the following manner: The hot layer of glass is spread out on a hollow plate provided with holes in its upper surface, said hollow plate being arranged to be turned upside down and having connections for an elastic pressure medium to be led into said hollow plate. The spread-out hot layer of glass having had its surface smoothed down in any convenient manner and having had its rim confined to the plate by a suitable frame, the plate is turned upside down, and the hot glass within the frame may be allowed to sag or sink and is afterward, by means of the elastic pressure medium, caused to expand to a hollow ball-like body, which is then inclosed within a skeleton form or mold constructed of sharp-edged fillets, which form together the edges of a cube or prism. By continually expanding this glass body within the said skeleton form or mold by means of the elastic pressure medium the said body will expand so far that it will lie with its corners against the edge fillets of the form or mold, and thereby be prevented from expanding further except at the parts between the fillets, which parts, bulging out beyond the skeleton form, give the body the form of a prism with bulging sides. The bulged-out portions of the hollow body, constituting its bottom and sides, after having been separated at the edges or corners formed by the edge fillets of the skeleton form or mold will deliver glass panels, which are afterward flattened into sheets.

The apparatus for carrying out the above process of manufacturing sheet-glass is shown in the annexed drawings.

Figure 2:
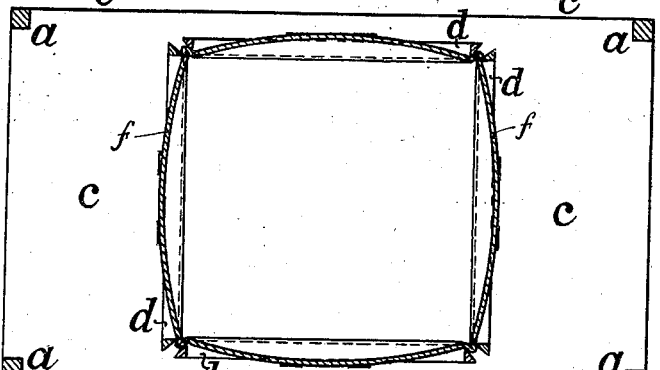
Figure 3:
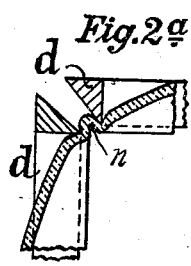
Figure 3:
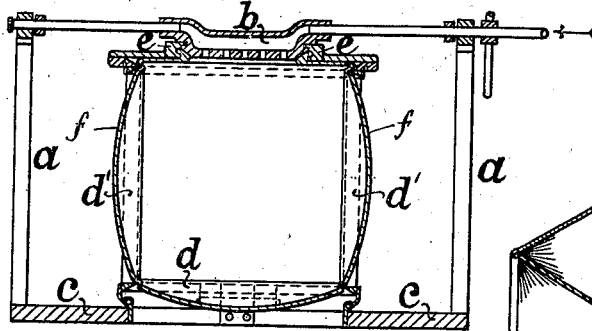
Figure 4:
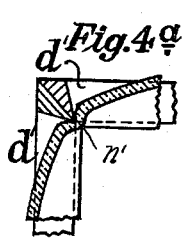
Figure 4:
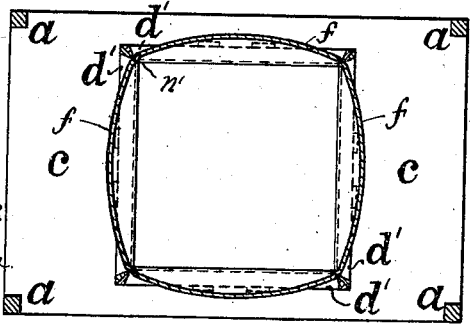
Figure 5:
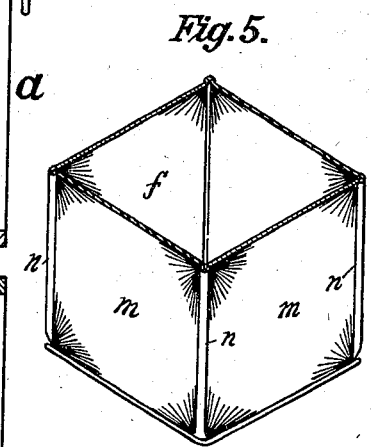

Figure 1 is an upright view of the complete apparatus, partly in section, showing the hot glass in several stages of expanding, the skeleton form or mold being left open during such expansion. Fig. 2 is a plan corresponding with Fig. 1, partly in section, showing the blown-glass body within the closed skeleton form or mold composed of fillets, the upper hollow plate being removed; Fig. $2^a$, a horizontal section corresponding with Fig. 4, but on a larger scale, of one of the corners of the skeleton form and of the blown-glass body therein; Fig. 3, an upright view of the apparatus partly in section and with the closed skeleton form or mold including the blown hollow glass body. Fig. 4 is a plan of Fig. 3, partly in section, showing the blown-glass body within the skeleton form or mold, the upper hollow plate being removed; Fig. $4^a$, a horizontal section corresponding with Fig. 4, but on a larger scale, of one of the corners of said form and the glass body therein. Fig. 5 is a perspective view of the glass body which has been blown out within a filleted skeleton form or mold, but freed from or taken out of such skeleton form or mold.

Referring to Fig. 1, $a$ represents the uprights erected on the base-plate $c$ and carrying the boxes $a'$, which receive the trunnions $b'$ $b^2$ of the hollow plate $b$, with perforated surface upon which the hot layer of glass is deposited. The trunnion $b^2$ is hollow and constitutes the conduit through which the compressed air or other pressure medium enters the cavity of said plate. $e$ is the frame, of suitable shape, by which the glass layer is held on said perforated surface. The plate and frame are shown upside down.

The base-plate $c$ has a suitable central opening around which is arranged the form or mold composed of sharp-edged fillets $d$, hinged to said plate, so that they may be set upright, as indicated by the arrows in Fig. 1, and may be kept in this upright position by connecting them in any suitable manner to the upper frame $e$. The sharp-edged fillets $d$ of the form or mold by which the corners of the hollow body $f$ are formed may be spaced to make double edges, as shown in Figs. 2 and $2^a$, or may be arranged to come close together to form a single edge, as shown at $d'$ in Figs. 4 and $4^a$.

When the skeleton form or mold represented in Figs. 1 and 2 is closed, its fillets $d$ presenting double edges, will form at the corners slits within which, as shown in Figs. 2 $2^a$, and 5, the glass at the corners of the hollow glass body will bulge out, the so-bulged-out parts $n$ forming the separating-lines at which the body may be divided into sheets.

When the skeleton form or mold represented in Figs. 4 and $4^a$ is closed, its sharp fillets $d'$ present together single edges which form corners at which the glass will be bulged inward during expansion, the so-bulged-in parts $n'$ forming the separating-lines on which to divide the body into sheets. The fillets $d$ $d'$ must be so hinged that if they are closed to form the skeleton form or mold they may easily be turned away from the bulged-out or bulged-in part of the glass body when the hot glass has solidified so far that the hollow body may be removed from the plate $b$ or from the shaping-frame $e$.

It is indicated in Fig. 1 how the sagging or sinking and the blowing of the glass body $f$ in the different stages $f'$ $f^2$ $f^3$ is proceeded with until the closing of the skeleton form or mold may take place, as shown in Fig. 3, whereupon by the continued blowing out the ball-like body will meet against the corner-fillets, thereby according to Figs. 2, $2^a$, and 5 bulging out at the corners $n$ and according to Figs. 3, 4, and $4^a$ bulging in at the corners $n'$, the intermediate portions $m$ in both cases being expanded outwardly beyond the fillets in the form of panels $m$ until the admission of the elastic pressure medium is shut off. The body now has the form of a hollow cube or prism with bulged-out sides.

After sufficient solidification of the glass the upright fillets $d$ are turned down, and the glass body is removed from the shaping-frame $e$. The body may now be at once divided at its corners $n$ or $n'$ by cutting or by any means known to glass-workers into panels $m$, which have only to be flattened by any of the means known to glass-blowers to produce plates retaining on both sides their perfect fire-polish.

What I claim as my invention is—

The process of manufacturing glass sheets with fire-polished surface on both sides, consisting in first expanding a hot layer of glass by an elastic pressure medium into a hollow prism with bulged-out sides, next dividing said prism at its angles to form panels of its sides, and afterward flattening said panels to form the sheets.

In testimony that I claim the foregoing as my invention I have signed my name, in presence of two witnesses, this 10th day of December, 1901.

PAUL THEODOR SIEVERT.

Witnesses:
HERNANDO DE SOTO,
PAUL ARRAS.